United States Patent [19]

Roberts et al.

[11] Patent Number: 4,677,553

[45] Date of Patent: Jun. 30, 1987

[54] SECURE PLACEMENT OF CONFIDENTIAL INFORMATION ON A CIRCULATED BLANK TICKET

[75] Inventors: Brian J. Roberts, San Diego; James T. Walters, Oceanside, both of Calif.

[73] Assignee: International Totalizator Systems, Inc., San Diego, Calif.

[21] Appl. No.: 670,156

[22] Filed: Nov. 9, 1984

[51] Int. Cl.[4] .................... G06F 15/28; G06F 15/44; G06G 7/48

[52] U.S. Cl. .................................... 364/412; 283/72; 283/94; 283/99; 283/100; 283/903; 273/269

[58] Field of Search ..................... 364/410, 411, 412; 283/99, 903, 94, 72, 100, 91, 904, 111; 346/76 PH, 162, 163; 273/138 A, 269, 274

[56] References Cited

U.S. PATENT DOCUMENTS

| | | | |
|---|---|---|---|
| 3,956,049 | 5/1976 | Johnsen | 156/200 |
| 4,189,353 | 2/1980 | Harriman | 283/94 |
| 4,190,268 | 2/1980 | Webster | 283/72 |
| 4,191,376 | 3/1980 | Goldman et al. | 273/139 |
| 4,209,047 | 8/1978 | Fredrickson | 428/307 |
| 4,299,637 | 11/1981 | Oberdeck et al. | 156/64 |
| 4,429,015 | 1/1984 | Sheptak | 428/201 |
| 4,494,197 | 1/1985 | Troy et al. | 364/412 |

FOREIGN PATENT DOCUMENTS 304356 6/1982 Fed. Rep. of Germany .

*Primary Examiner*—E. A. Goldberg
*Assistant Examiner*—Lincoln D. Donovan
*Attorney, Agent, or Firm*—Brown, Martin, Haller & Meador

[57] ABSTRACT

Secure placement of confidential information on tickets distributed in blank is permitted by opaquely overlaying an area of the ticket upon which the information is to be placed in visible form and employing a printing apparatus that prints the visible information on the ticket area through the opaque overlay without leaving any easily-discernible trace in the overlay that reveals the imprinted information. A ticket can be given in blank to a ticket holder. Then, when the ticket holder makes an exchange in order to receive the information, the information can be placed on the ticket, with the opaque overlay concealing the information until selectively removed by the ticket holder.

44 Claims, 6 Drawing Figures

SECURE PLACEMENT OF CONFIDENTIAL INFORMATION ON A CIRCULATED BLANK TICKET

BACKGROUND OF THE INVENTION

The present invention is concerned with the transfer of confidential information to a subscriber by means of a portable ticket. More specifically this invention relates to games of chance in which outcomes are indicated to a player by means of confidential information printed on a blank ticket in such a manner as to conceal the information from sight until the player selectively exposes it.

As is known, games of chance such as instant lotteries are played by patrons who purchase lottery tickets, each of which has the outcome of a patron's lottery play printed on it. Typically, the play result is imprinted in some visible form on a predetermined area of the ticket that is thereafter covered by an overlay to conceal the play result. In the prior art such tickets are produced by a continuous printing process that imprints the result of a respective play on each ticket and then covers the printed result by the opaque covering.

The tickets with their pre-printed, concealed play results are then bundled and distributed through the lottery organization to agents who sell the tickets to the lottery patrons. Typically, extreme security measures must be implemented for the printing, distribution and servicing to the lottery tickets. Because the tickets are premarked, they have a determinable value that can be ascertained if the printed results are known. In the normal course, each ticket is assigned a unique serial number so that a winning ticket can be spotted and identified prior to its sale. In order to prevent unscrupulous persons who might have access to information associating ticket serial numbers with gaming outcomes from wrongfully manipulating the results of the lottery, the aforementioned security measures are maintained throughout the whole line of ticket distribution to the lottery patrons.

Because the line of distribution is so long and involves so many people including persons responsible for printing, administering, warehousing, and distributing the tickets to agents, the security measures are extreme and expensive. Ultimately, the profit earned by a lottery is reduced by the cost of the security measures involved.

Because lotteries are often used to raise revenue for public or quasi-public purposes, it is necessary to control the costs of promoting the games in order to maximize the benefits the public derives from the games. Therefore, a system that could efficiently distribute confidential lottery result information to patrons in an efficient, secure, yet inexpensive manner would enhance the public benefit derived from the game.

It is therefore the principal object of the present invention to permit secure placement of confidential information on a generally-circulated blank ticket.

It is a further object of the present invention to provide a system having the ability to securely place the confidential information on the blank ticket after it is circulated.

SUMMARY OF THE INVENTION

These objects are realized by the provision of tickets that can be generally circulated in blank form to subscribers who wish to obtain confidential information by means of a ticket. Each ticket is provided with the ability to receive the information in visible form and, during and after receipt of the information, to conceal it from the ticket holder. Once the information is placed on the ticket, it is returned to the patron who then implements a procedure for exposing the concealed confidential information.

In the instant invention a ticket is circulated or transferred to a lottery patron. When the patron initially obtains the ticket it is devoid of any information indicating an outcome or result. However, the ticket has a predetermined area upon which lottery outcome information can be printed in visible form. An overlay conceals the predetermined area from the view of the patron until after the patron removes it.

When the patron purchases a change in the lottery, the ticket is entered into a printer employing a printing process that places visible characters indicating the outcome of the lottery attempt through the overlay onto the predetermined area in such a manner that the printed information is hidden and not indicated by the overlay. The ticket is also imprinted with a serial number associated with the respective outcome. Then, the ticket is returned to the patron who can discover the outcome by removing the opaque overlay.

The above, and other objects, features and advantages of this invention will be apparent in the following detailed description of an illustrative embodiment thereof, when the description is read in connection with the accompanying drawings.

DESCRIPTION OF THE PREFERRED EMBODIMENT

Figure 1:
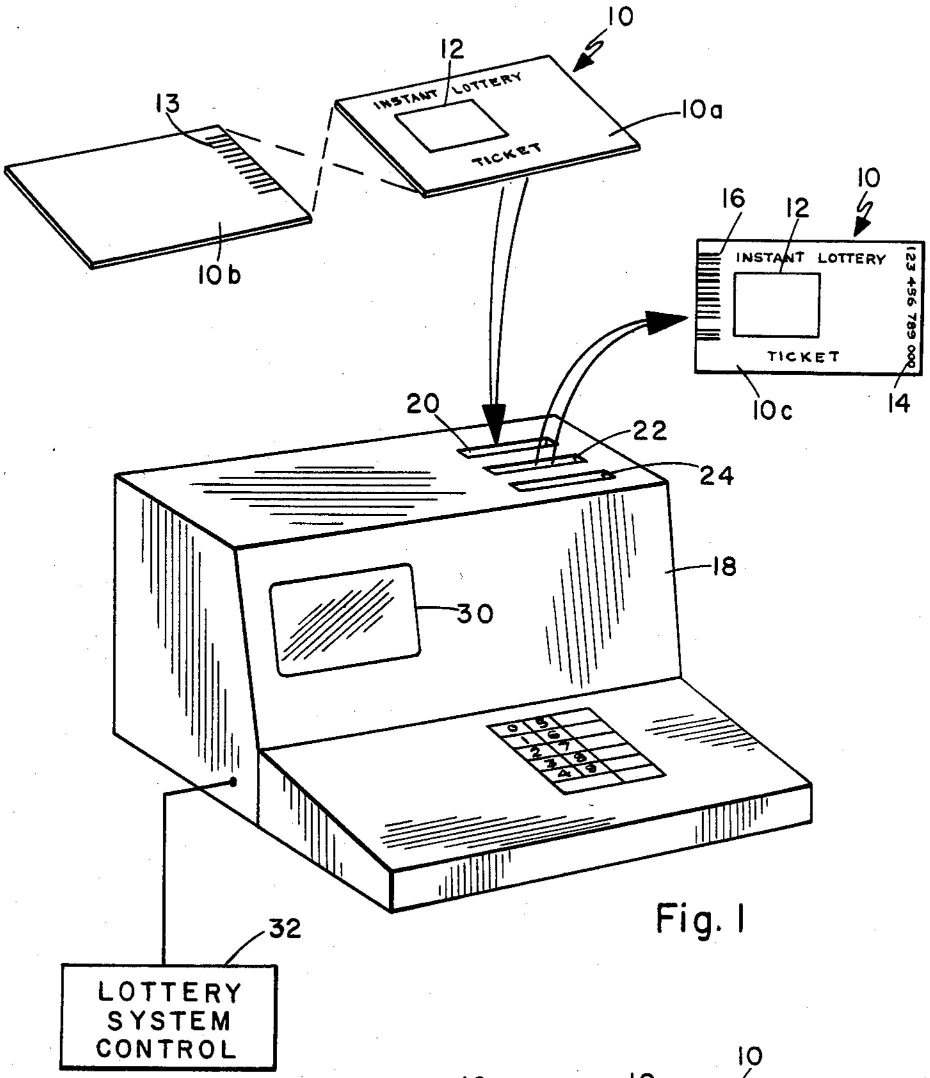
FIG. 1 illustrates the imprinting of a generally-circulated blank ticket with concealed information.

With reference now to FIG. 1 there is illustrated a ticket, indicated by 10, that is one of many generally circulated to patrons of a system which distributes confidential information. The reference numeral 10*a* indicates the upper surface of the ticket, which includes an area 12 on which a visible indication of the confidential information to be obtained by the holder of the ticket 10 is to be printed. The reference numeral 10*b* indicates the obverse surface of the ticket on which a conventional bar code 13 is printed that indicates a category to which the ticket belongs.

The ticket 10 can comprise, for example, an instant lottery ticket of the type wherein the holder purchases the ticket and with it a chance in the lottery. As is known, a presently-available instant lottery ticket, when purchased by a lottery player would have the outcome of the player's purchased chance already printed on the ticket. As is known, the outcome on such a ticket would be printed at the time that the ticket was manufactured and covered during the process of printing the result by an opaque covering that the patron would remove after purchasing the ticket.

Such a covering can comprise, for example, a scratch-off ink that a patron can remove by rubbing or scraping. When the scratch-off ink is removed, the underlying printed information is revealed.

However, the ticket 10 differs from the conventional instant lottery ticket in that the area 12 where the lottery result is to be printed is blank when the ticket is obtained by a lottery player. Further, in the preferred embodiment, the area 12 is covered by an opaque overlay when the ticket is distributed. The overlay which conceals the area 12 therefore conceals nothing from the ticket holder when he initially obtains the ticket 10.

In contrast with the conventional type of instant lottery ticket, the lottery result purchased by the holder of the ticket 10 is printed in the area 12 through the opaque overlay only after the holder of the card exchanges cash for his lottery chance. Then, the ticket has the outcome of the purchased chance printed through the opaque overlay into the area 12. After this printing, the upper surface of the ticket 10 is indicated by 10*c*.

The surface 10*a* of the ticket still has the opaque overlay covering the area 12. However, a result has been printed through the opaque overlay into the area 12 in such a manner as to conceal the result by means of the overlay until the patron voluntarily removes it.

At the same time that the result is printed through the overlay, a unique serial number 14 associated with the respective information printed in the area 12 is printed in visible form at one end of the ticket surface 10*c*. The serial number is also represented by a visible bar code 16 printed at the other end of the ticket.

After the patron has obtained the ticket 10 and purchased a chance in a lottery game, he surrenders the ticket 10 to a lottery agent who inserts the ticket 10 into a printer terminal 18 through an input slot 20. The printer terminal 18, in a manner described hereinbelow, prints the lottery chance result through the opaque covering into the area 12 in such a manner that the opaque covering conceals the printed outcome when the process is complete. The printer also prints the serial number 14 and bar code 16 on the ticket and returns the ticket 10 through a customer output slot 22 at the top of the printer terminal 18.

The slot 20 is used by the lottery agent to enter a ticket imprinted with a serial number and a result for validation as explained hereinbelow. The validated ticket is returned to the agent through the slot 24. The printer terminal 18 includes a programmable processor, not shown, to initiate the process of issuing a lottery result by printing it onto a ticket or validating a lottery result printed on a ticket. The printer terminal 18 also includes a CRT having a screen 30 for indicating various pieces of control information to the lottery agent who operates the terminal.

As explained in further detail below, the printer terminal 18 obtains the information to be printed on the ticket 10*a* from a lottery information source 32, which provides lottery outcome and serial number information to the terminal 18 in the form of signals which the terminal translates to the information printed on, for example, the ticket surface 10*c*.

Figure 2:
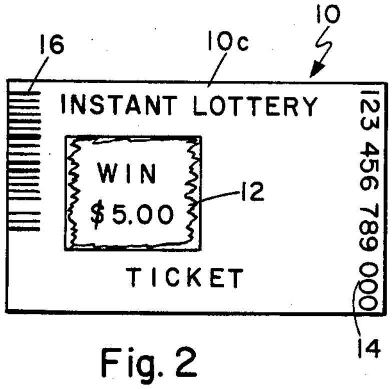
FIG. 2 illustrates how the printed information on the ticket is exposed to the view of the ticket holder.

As illustrated in FIG. 2, once the ticket 10 has been completely printed by the printer terminal 18 and returned to the patron, the patron can remove the opaque overlay to expose the result indicated by the information printed in the area 12. For example, in FIG. 2 the legend WIN $5.00 is exposed to the ticket holder's view when the opaque overlay is removed.

Figure 3:
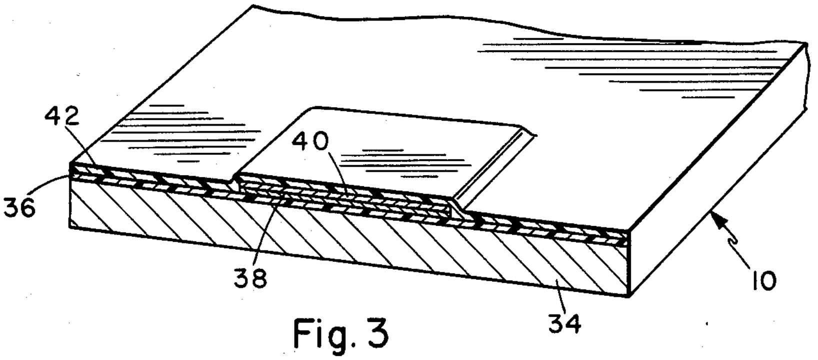
FIG. 3 is an enlarged cross sectional view of a ticket constructed to receive visible information from a printer through an opaque overlay which conceals the printed information until removed by a holder.

In FIG. 3 an enlarged half section of the ticket 10 includes a ticket blank portion 34 consisting of a piece of conventional seven millimeter card stock having a thermally-sensitive surface finish. A release coat 36, consisting of a thin layer of thermo-setting varnish, is applied over the thermally-coated surface. On top of the release coat 36, and over the area where information is to be printed on the ticket 10, an opaque overlay 38 consisting of a coat of scratch-off ink is placed to overlie and cover the area 12 of the card 10 where lottery result information is to be printed. A second opaque overlay 40 consisting of a camouflage coat of white flexographic ink is applied by a printing plate having an irregular surface in order to make the composite opaque overlay diffusely reflective. A diffusely reflective overlay surface is useful to camouflage any secondary effects of the printing process that might leave an outline or other indication of the information printed into the area 12 through the overlay that might be detectable on a specularly reflective or mirror-like surface. Finally, an overlay coat of varnish 42 is applied over the upper face of the ticket 10 that includes the composite overlay consisting of the ink layers 38 and 40.

This particular structure permits the area of the thermally-coated ticket stock underlying the opaque covering to be imprinted by a conventional thermal printing process that acts through the overlay after it is in place. When the thermal printing is completed, the imprinted information can be observed by scratching or rubbing off the overlay.

The inventors have had tickets such as the ticket 10 produced on a flexographic press with multiple work stations. Using the flexographic press, a ticket blank consisting of a seven millimeter thermally-coated coat stock is fed on a first pass through the press during which a varnish is applied on the upper surface of the card and cured into a glossy finish at an ultraviolet curing station forming a part of the press. The thickness of the release coat varnish layer is left to the needs of the designer; however, the inventors have successfully used tickets having a varnish layer 36 of less than one millimeter thickness. During a second pass of the varnished ticket blank on the flexographic press, markings such as the bar code 13 on the ticket 10*b* are applied at a first press station to the non-coated side of the ticket using regular flexographic ink. At a second station, after the marking on the non-treated side of the ticket, one coat of opaque scratch-off ink is applied. Preferably, the ink has an optical density that is sufficient to conceal a portion of the ticket surface underlying it. At a third work station, another layer of scratch-off opaque ink is applied on top of the first ink layer. At a fourth press work station, after application of the opaque ink layers, graphics are applied to the coated side of the ticket 10. At a fifth work station, after application of the graphics, a camouflage coat 40 of white flexographic ink is applied in a manner to maximize the optical diffusion of the opaque overlay. Next, at the sixth work station during the second pass of the card 10 through the press, the overlying varnish coat 42 is applied over the whole top surface of the card 10. Then, the finally-coated ticket is passed through a set of knurling rollers which rough the surface, again to make it optically diffusive, and the card is cured at the ultraviolet station.

Although a plurality of materials are available to use in constructing the ticket 10, the inventors have successfully constructed a ticket with the following material selection:

| Reference Numeral | Product No. | Manufacturer or Distributor |
|---|---|---|
| 34 | Ticket Stock Type 2700 | 3M, St. Paul, MN |
| 36, 42 | UKJ1019-A Varnish | Inmont Corp., Hawthorne NJ |
| 38 | WC-190NHP Scratch-Off Ink | Elecktromek, Carlstradt NJ |
| 40 | White Flexographic Ink | Inmont Corp., Hawthorne NJ |

Figure 4:
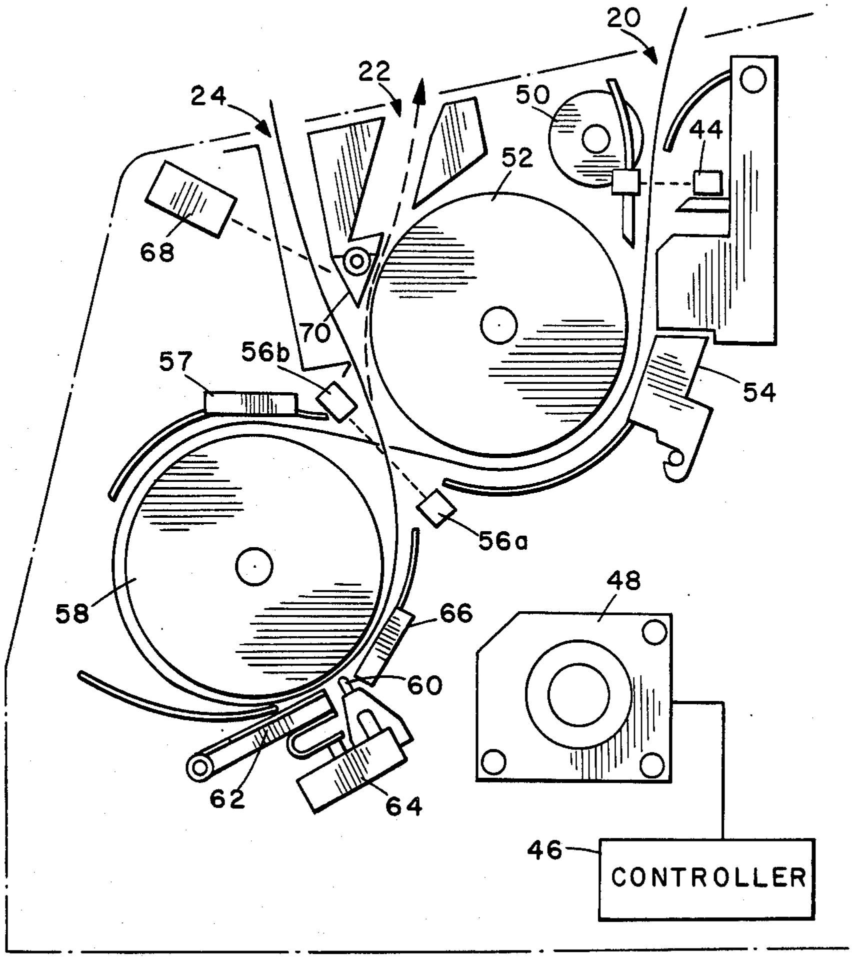
FIG. 4 is a mechanical schematic diagram illustrating how a ticket is imprinted with secure information through the opaque overlay.

With reference now to FIG. 4, the printing method and mechanism employed by the printer terminal 18 to print the information on the surface of the card 10 in the area 12 beneath the opaque overlay without disturbing or leaving any indication in the overlay is illustrated. Preferably, the printer terminal 18 comprises one of the Datamark DM family of printing terminals available from International Totalizator Systems, Inc., the assignee of this patent application. While a general organization and operation of the printer terminal 18 can be understood with reference to an available Datamark maintenance manual, a reader/printer mechanism embodied in the terminal is illustrated in detail in FIG. 4. The reader/printer accepts tickets through the input slot 20. When the ticket enters the slot 20 the light path of a photosensor 44 is interrupted. The photosensor 44 is connected to a controller 46, comprising a programmable processor, that starts and selectively and incrementially operates a stepper motor 48 when the photosensor light path is interrupted. The motor 48 is conventionally coupled to drive a feed pulley 50 and a pair of rollers 52 and 58. When activated, the pulley 50 grasps the ticket and propels it on an input ticket path past an upper roller 52 which presses the back of the ticket against a conventional bar code reader 54 connected to the controller 46. The reader 54 reads the ticket category code on the ticket surface corresponding to ticket surface **10*b* of FIG. 1. The code is indicated to the controller 46 by the reader 54. When a lottery ticket category code is detected, the processor 46 awaits an input from a sensor including optical elements 56*a* and 56*b***.

When the ticket has been propelled by the roller 52 between the optical elements **56*a* and 56*b*, a light beam passing between the elements is interrupted, which causes an interruption signal to be provided to the controller 46. Upon receiving the indication that the ticket has passed between the elements 56*a* and 56*b*, the controller 46 activates another bar code reader 57 and an optical sensor 60, to both of which it is connected. The lower roller 58 propels the ticket past the reader 57 which reads the face of the ticket corresponding to the ticket face 10*a* of FIG. 1** and indicates to the controller the presence and content of any bar codes on the face.

Assuming that no bar code has been read by the reader 57, the controller 46 prepares to issue a lottery chance by having a serial number, a serial number bar code, and a lottery result thermally printed on the ticket in a location corresponding to the location for identical printings illustrated in FIG. 2. Under these circumstances, when the lower roller 58 has propelled the forward edge of a ticket past the sensor 60, the sensor 60 sends a print location signal to the controller 46. At this, the controller 46 enters a conventional printing routine, passing data to a conventional thermal printer 62, energizing the print solenoid 64, and pulsing the motor 48 each time a row of dots, which make up characters, is to be printed on a ticket. Preferably, the thermal printer 62 prints by a dot-matrix format and prints the serial number, the lottery chance result, and the bar code representing the serial number at the appropriate locations on the card.

The inventors have selected a thermal printing process to print on a card because the process is effective to print through the opaque overlay constructed according to the description provided hereinabove onto the concealed area 12 of the ticket, which includes a portion of the thermally-coated ticket surface which is responsive to thermal printing.

In printing into the concealed area 12, the thermal printing process leaves no easily-discernible mark or other indication in the opaque overlay. However, the ticket stock is responsive to thermal printing and responds in a typical fashion to the thermal printer by producing visible printed characters at locations on the prepared surface of a ticket corresponding to the location on surface **10*c* in FIG. 1**.

Thus it is possible to print confidential information into the concealed area and to conceal, by means of the opaque overlay, the printed information during and after the printing process so that the ticket can be provided to the patron with the confidential information still concealed by the opaque overlay.

As the printing operation progresses, a post-print bar code reader 66 reads the bar-coded serial number of the ticket, providing an indication of the read bar code to the controller 46.

If the bar code read by the reader 66 is correct, the controller 46 causes the solenoid 68 to remain idle, keeping the diverter gate 70 off of the upper roller 52 so that the ticket is passed through the output slot 22 to the patron.

If the bar code is incorrect, the solenoid 68 is energized to move the diverter gate 70 onto the upper roller 52 and to divert the ticket to the agent output port 24, where the agent can retrieve it and take the appropriate action.

The terminal printing mechanism controller 46 also controls the mechanism to process tickets imprinted with serial number bar codes. Thus, when a patron has discovered that he has a winning outcome printed on his ticket, he will present the ticket to the agent who will enter it into the terminal for validation.

During the validation procedure, a ticket is inserted through the slot 20 by the agent, passes the reader 54 and the sensors **56*a* and 56*b* and is guided by the lower roller 58 past the bar code reader 57 which reads the serial number bar code and passes the information to the controller 46**.

If the controller 46 finds that a serial number has been entered on the ticket, it checks also to discover if the ticket has been validated. If not, the terminal obtains confirmation of the outcome and passes the ticket under the printer 64 to have a validation mark printed on the ticket's upper surface. If a ticket has been previously validated, nothing more is printed on it.

When the validated ticket is propelled by the lower roller 58 past the sensor 60, the sensor 60 provides a presence signal to the controller 46 which activates the solenoid 68. Activation of the solenoid 68 places the diverter gate 70 on the upper roller 52 and diverts the ticket out through the agent's output slot 24.

Figure 5:
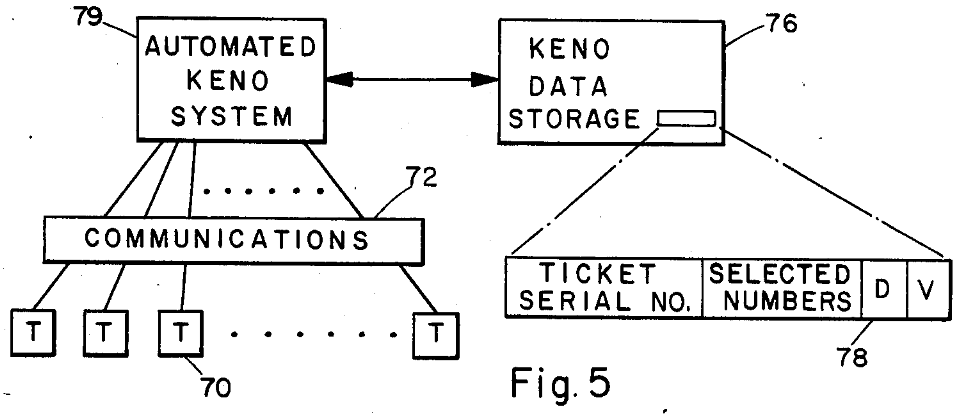
FIG. 5 is a block diagram illustrating how the ticket of FIG. 3 and the printing terminal of FIG. 4 can be employed in an instant lottery system.

FIG. 5 illustrates a system for implementing a lottery game in which tickets constructed according to FIG. 3 are distributed in blank to game players. It should be evident that because the tickets are distributed in blank, security requirements to protect them during printing, storage, and distribution are attenuated. Furthermore, since the tickets are blank when they are distributed and circulated among the population desiring to participate in the lottery, they have a minimal initial value, which reduces the likelihood of their being counterfeited.

In the system of FIG. 5, a plurality of printer terminals (T), one indicated by reference numeral 70, are placed at various lottery agency locations throughout the geographical area in which a lottery game is to be played. Each of the terminals corresponds to the terminal 18 of FIG. 1 and includes the printer/reader mechanism of FIG. 4. In addition, each of the terminals includes conventional communication circuitry which enables its controller to communicate through a communications system 72 with a central computer system 79. The communications system 72 can include, for example, telecommunications links such as telephone lines. As is known, printer terminals such as the above-referenced Datamark family include the ability of communicating via standard telecommunications links with a central computer system. Further, central computer systems including master processors are available to control gaming operations of remote printer terminals such as 70. For example, the Datamark terminal family is used in a conventional configuration controlled by a central computer to conduct pari-mutual and lottery betting operations.

Algorithms and techniques are known which can be implemented in the central computer system 79 to randomly produce lottery results. Further, algorithms are known which can randomly associate such results with a predetermined list of serial numbers for lottery tickets. Such techniques are employed, for example, when preprinted instant lottery tickets are printed and processed for distribution. In the system of FIG. 5, instead of providing the lottery chance results with the associated ticket serial numbers for printing on individual preprinted tickets, the results and their associated serial numbers are stored in a game data storage device 76. The game data storage device 76 can comprise any conventionally-available storage medium such as hard discs. An exemplary data entry in the storage device 76 is represented by the data format 78. The data format for each individual lottery chance result stored in the storage device 76 includes a ticket serial number, the lottery chance result or outcome, and information indicating whether or not the serial number and outcome have been distributed (D) to a lottery patron. Finally, an information storage sector is used to store information indicating that the lottery ticket on which the serial number and outcome have been printed has been returned to a lottery agent for validation (V).

Figure 6:
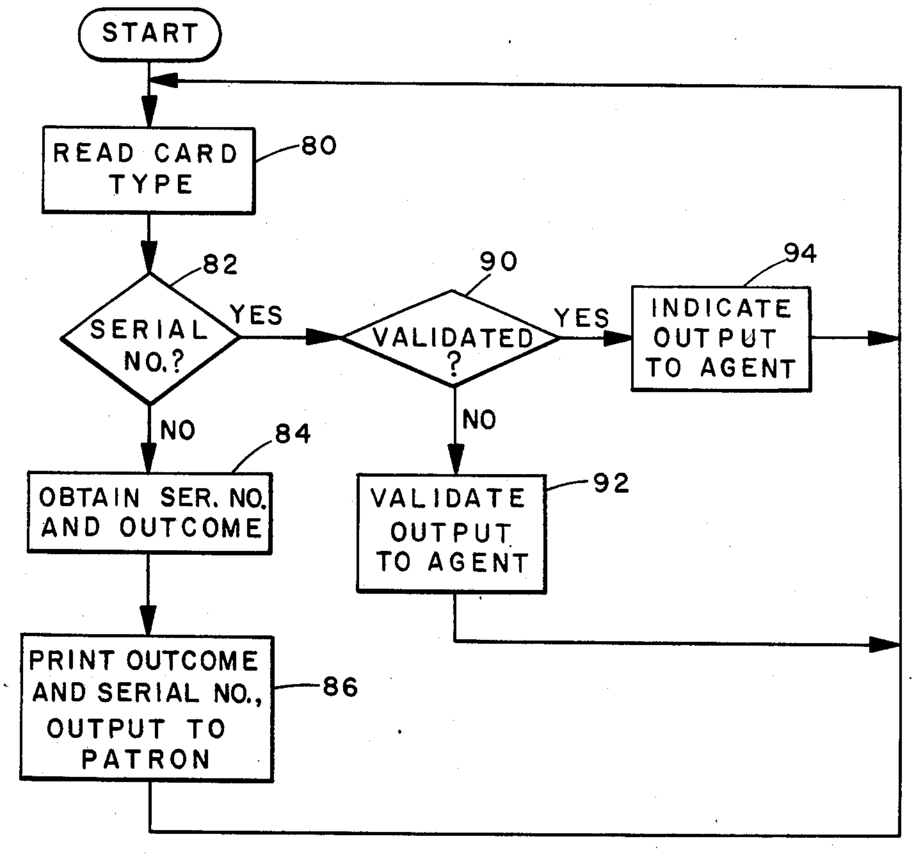
FIG. 6 is a flow diagram illustrating a routine implemented by the system of FIG. 5 to provide in a secure manner the outcome of a lottery chance on the ticket of FIG. 3 and to validate a chance outcome on the ticket.

The general sequence of operations of the system of FIG. 5 can be understood with reference to FIG. 6. At the beginning of a game, for example, an instant lottery game, the central computer system 79 will randomly generate the game outcomes and randomly associate respective ones of a plurality of ticket serial numbers with the outcomes. All of the outcomes and their associated serial numbers will be stored in an appropriate format in the game data storage device 76. Then, a quantity of tickets equivalent to the ticket 10 are distributed to agents and sold for a nominal sum, or possibly even distributed for free to potential game patrons. When a potential patron decides to purchase a chance in the lottery game, the patron pays the lottery agent for the chance and surrenders his blank ticket to the agent. The agent then operates his printer terminal to obtain a ticket serial number and lottery game outcome from the central system 79. The general sequence of operations followed by the system of FIG. 5 in issuing and validating lottery chances is illustrated in FIG. 6.

When the patron purchases a lottery chance and surrenders his card to the agent, the agent places the blank ticket in the slot 20 of his terminal. As described above, the terminal controller will read the card category type in program step 80 to confirm that the ticket is a lottery ticket. Next, the serial number reader (reference numeral 57 in FIG. 4) will be activated to determine whether a serial number bar code has been placed on the ticket. This is represented by decision block 82. Of course a blank ticket, that is one which has not had a lottery result printed on it, will have no serial number. In this event, the negative exit will be followed from block 82 and in step 84, the terminal controller will establish communication with the central computer system to obtain a ticket serial number and chance outcome to be printed on the blank ticket. At the same time the system will enter information into the distribution (D) sector of the data storage location whence the serial number and outcome were obtained to indicate that they have been distributed. Once the distribution information is entered into this storage sector, that serial number and outcome will not be used again for the remainder of the lottery game. Then the central system 79 provides the information to the printer terminal and, in program step 86, the serial number is visibly printed in numeric and bar code form on the ticket and the lottery result is printed through the opaque overlay of the ticket. Then the printer terminal controller passes the ticket through the patron output slot to the patron.

Returning to FIG. 6, in the event that the printer terminal controller detects a serial number on a ticket during an issue routine prior to the obtaining and printing steps, it will take a positive exit from program step 82, providing a visual indication to the lottery agent on the screen of the terminal.

Thus, after a patron has purchased a chance, had his ticket printed, and removed the ticket's opaque overlay to discover a winning outcome such as is indicated in FIG. 2, he can present the winning ticket to a lottery agent for payment. In the validation routine of FIG. 6, a printed ticket presented for payment is entered into the input slot of a printer terminal, the printed serial number bar code is detected and the terminal controller follows the positive exit from block 83 while imposing a sequence of operations resulting in the reading of the bar-coded result thermally printed onto the ticket in the result printing area. Once the result is read and interpreted by the terminal controller, the controller establishes communication with the central system 79 to indicate that a ticket bearing the detected serial number has been presented for payment. This is accomplished between program steps 82 and 90.

As indicated by the decision in step 90, the central system 79 consults the record entry in the data storage device 76 associated with the read serial number. If the card has not previously been validated, then no entry will have been made in the validation (V) sector of the information field and the system 79 will send a message to the terminal indicating that the terminal should validate the ticket for payment (step 92). Once this message is transmitted by the central system 79 an entry is made into the V segment of the serial number record to indicate that the printed ticket has been presented for payment and validated. In order to prevent a subsequent presentation of the same ticket for a payment upon a claim that the computer system 79 has malfunctioned, the terminal, in validating the ticket, will cause a validation mark to be printed on the ticket during the validation step 92.

Should a previously-validated ticket be later presented to claim a payment, both the controller 46 and the system 79 will detect respective validation indications and take the positive exit from decision block 90. In this case, a message indicating prior validation and payment will be presented on the terminal screen for the lottery agent's information and the ticket will be retained by the agent.

Although the system of FIG. 5 has been presented in terms of distribution of lottery chances, it can be used to securely distribute any kind of confidential information to an information subscriber holding a blank ticket identical to that described above.

Although an illustrative embodiment of our invention is described hereinabove with reference to FIGS. 1–6, it should be understood that the invention is not limited to the disclosed embodiment, and that it may be practiced otherwise than as specifically described without departing from its essence.

We claim:

1. A system for distributing confidential information to a subscriber, comprising:

receiving means for accepting a blank ticket, said ticket having print responsive means for receiving information in printed form and said ticket having masking means overlying said print responsive means for concealing said printed form information during and after the reception of said printed form information by said print responsive means and for being operated after the receipt of said printed form information to reveal said printed form information; and print means associated with said receiving means for, after acceptance of a ticket, entering said printed form information onto said print responsive means through said masking means while said masking means conceals said printed form information during and after said entry.

2. A ticket distributed in blank to a holder for securely receiving confidential information in printed form from a printing device, comprising:

a ticket body responsive to a printing device for being imprinted with information;

masking means overlying a portion of said ticket body through which said printing device acts to imprint said information on said ticket body portion, said masking means for, during and after the imprinting of said printed information onto said ticket body portion, concealing said printed information on said ticket body portion and for, after the imprinting of said information onto said body portion, being operated by a holder to reveal said imprinted information.

3. A method of distributing confidential information, comprising the steps of:

distributing one or more blank tickets, each of said tickets having print responsive means for being imprinted with said information and masking means covering said print responsive means for concealing information imprinted onto said print responsive means during and after the imprinting of said information on said print responsive means and for being operated after said receipt to reveal said imprinted information;

after said distribution step, imprinting said printed form information onto said print responsive means through said masking means while said masking means conceals said imprinted information; and operating said masking means to reveal said imprinted information.

4. The system of claim 1 wherein the print-responsive means includes means for receiving thermally printed information.

5. The system of claim 1 wherein the print-responsive means includes a ticket stock material sheet responsive to a printing process that produces visible printing on the material sheet.

6. The system of claim 5 wherein the ticket stock material is responsive to a thermal printing process.

7. The system of claim 1 wherein the masking means includes an opaque overlay disposed over said print-responsive means.

8. The system of claim 7 wherein the opaque overlay is a removable opaque overlay.

9. The system of claim 1 wherein the print means is a thermal printer.

10. The system of claim 9 wherein the print means and receiving means are contained in a printing terminal.

11. The ticket of claim 2 wherein the ticket body includes print-responsive means for receiving said information in printed form.

12. The ticket of claim 11 wherein the print-responsive means includes means for receiving thermally printed information.

13. The ticket of claim 11 wherein the print-responsive means includes a ticket stock material responsive to a process that produces visible printing on the material.

14. The ticket of claim 13 wherein the ticket stock material is responsive to a thermal printing process.

15. The ticket of claim 2 wherein the masking means includes an opaque overlay disposed over said print-responsive means.

16. The ticket of claim 15 wherein the opaque overlay is a removable opaque overlay.

17. The ticket of claim 15 wherein the opaque overlay includes a removable layer of ink.

18. The ticket of claim 17 wherein the opaque overlay includes a removable layer of material having a diffusely reflective surface.

19. The ticket of claim 15 wherein the opaque overlay includes a layer constructed to conceal an outline of said printed information formed when said ticket is imprinted with said information.

20. The ticket of claim 2 wherein said masking means includes a material layer that can be removed by scratching.

21. The ticket of claim 2 wherein said masking means includes a material layer that can be removed from said ticket body to reveal said imprinted information after said information is imprinted.

22. The method of claim 3 wherein said print-responsive means includes means for receiving thermally printed information.

23. The method of claim 3 wherein the print-responsive means includes a ticket stock material responsive to a printing process that produces visible printing on the material.

24. The method of claim 23 wherein the ticket stock material is responsive to a thermal printing process.

25. The method of claim 3 wherein the masking means includes an opaque overlay disposed over said print-responsive means.

26. The method of claim 25 wherein the opaque overlay is a removable opaque overlay.

27. A system for distributing confidential information to a subscriber, comprising:

a blank ticket for being provided to said subscriber;

central means for centrally storing and selectively distributing said confidential information;

terminal means connected to said central means for receiving confidential information and including means for receiving said blank ticket to be imprinted with said received confidential information;

print means for imprinting a representation of said received confidential information on said blank ticket; and on said blank ticket:

print-responsive means for being imprinted by said print means with said representation; and masking means overlying said print responsive means through which said print means imprints said representation on said print responsive means, said masking means for concealing said representation during and after said imprinting and for being operated after said imprinting to reveal said representation on said print responsive means.

28. The system of claim 27 wherein the print-responsive means includes means for receiving thermally printed information.

29. The system of claim 27 wherein the print-responsive means includes a ticket stock material responsive to a printing process that produces visible printing on the material.

30. The system of claim 29 wherein the ticket stock material is responsive to a thermal printing process.

31. The system of claim 27 wherein the masking means includes an opaque overlay disposed over said print responsive means.

32. The system of claim 31 wherein the opaque overlay is a removable opaque overlay.

33. The system of claim 27 wherein the print means is a thermal printer.

34. The system of claim 27 wherein the print means is a thermal printer.

35. A lottery system for securely distributing lottery outcomes to lottery patrons, comprising:

central means for randomly producing lottery outcomes and for compiling plural data entries, each data entry associating a respective outcome with respective identifying data;

remote terminal means connected to said central means for receiving a data entry;

print means associated with said remote terminal means for printing a representation of said received data entry; and a ticket including print responsive means responsive to said print means for being imprinted with said representation and masking means associated with said print responsive means for preventing the display of said imprinted representation during and after said imprinting and for being operated after said imprinting to display said imprinted representation.

36. The system of claim 35 wherein said remote terminal means includes means for receiving a ticket and transporting a received ticket to said print means.

37. The system of claim 35 further including validation means for validating a winning lottery outcome based upon a ticket imprinted with a lottery result representation of a data entry including said winning outcome and for authorizing a first delivery of a lottery prize corresponding to said winning lottery outcome.

38. The system of claim 37 further including means preventing, based upon a first validation of said winning lottery outcome, authorization of a delivery of said lottery prize.

39. A method of providing to patrons of a lottery, lottery results from a plurality of predetermined lottery results, comprising the steps of:

distributing to a patron one or more blank tickets, each blank ticket devoid of a lottery result and each blank ticket having print-responsive means for being imprinted with a lottery result and masking means for concealing said imprinted lottery result during and after the imprinting of said result and for being operated after said imprinting to reveal said imprinted result;

receiving a blank ticket from said patron;

randomly selecting, from said plurality of results, a lottery result to be imprinted on said received blank ticket;

imprinting said selected lottery result in the print-responsive means of said received blank ticket, while the masking means of said received blank ticket conceals said selected lottery result; and operating said masking means to reveal said selected lottery result.

40. The method of claim 39 wherein said step of imprinting includes thermally imprinting said selected lottery result in the print-responsive means of said received blank ticket.

41. A method of producing a ticket or the like for being imprinted with confidential information and for concealing said imprinted information during and after said imprinting, comprising the steps of:

producing a ticket stock having a surface area responsive to a predetermined print process that produces a visual representation of said information on said surface area;

applying, over said surface area of said ticket stock where said representation is to be printed, a removable opaque overlay layer through which said predetermined process acts to print said representation in said surface area and which conceals said representation during and after its printing.

42. The method of claim 41 further including, before said step of applying an opaque overlay, applying to said ticket stock a layer of material responsive to a thermal printing process for receiving said representation.

43. The method of claim 41 wherein said ticket stock has a surface finish responsive to a thermal printing process and said step of applying includes:

applying a first layer of opaque, scratch-off ink over said area; and applying a second layer of opaque white scratch-off ink over said first layer.

44. The method of claim 43 wherein said second layer includes a diffusely reflective surface.

* * * * *

UNITED STATES PATENT AND TRADEMARK OFFICE
CERTIFICATE OF CORRECTION

PATENT NO. : 4,677,553

DATED : June 30, 1987

INVENTOR(S) : Brian J. Roberts and James T. Walters

It is certified that error appears in the above-identified patent and that said Letters Patent is hereby corrected as shown below:

In Figure 5 of the drawing, in elements 76 and 79, please delete "KENO" and insert therefor "GAME"

Claim 34, line 53, column 11, delete "27" and insert therefor --28--.

Signed and Sealed this

Twenty-sixth Day of January, 1988

*Attest:*

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,677,553

DATED : June 30, 1987

INVENTOR(S) : Roberts et al

It is certified that error appears in the above-identified patent and that said Letters Patent is hereby corrected as shown below:

In Claim 15, column 10, line 48, please delete "2" and insert therefor --11--.

Signed and Sealed this

Twentieth Day of August, 1991

*Attest:*

HARRY F. MANBECK, JR.

*Attesting Officer*

*Commissioner of Patents and Trademarks*